(12) United States Patent
LI et al.

(10) Patent No.: US 12,442,843 B1
(45) Date of Patent: Oct. 14, 2025

(54) DIGITAL FULL EVEN HARMONIC DEMODULATION METHOD BASED ON FULL-PHASE ANALYSIS FOR MAGNETIC MODULATOR

(71) Applicants: Xiaoling LI, Beijing (CN); Shusheng Zhang, Beijing (CN); Wanzhang Wang, Beijing (CN)

(72) Inventors: Xiaoling LI, Beijing (CN); Shusheng Zhang, Beijing (CN); Wanzhang Wang, Beijing (CN)

( * ) Notice: Subject to any disclaimer, the term of this patent is extended or adjusted under 35 U.S.C. 154(b) by 0 days.

(21) Appl. No.: 19/012,427

(22) Filed: Jan. 7, 2025

(30) Foreign Application Priority Data

Aug. 5, 2024 (CN) .......................... 202411061476.6

(51) Int. Cl.
*H02J 3/36* (2006.01)
*G01R 19/25* (2006.01)

(52) U.S. Cl.
CPC ............ *G01R 19/2506* (2013.01); *H02J 3/36* (2013.01)

(58) Field of Classification Search
CPC .... G01R 19/2506; G01R 19/25; G01R 19/00; H02J 3/36
See application file for complete search history.

(56) References Cited

U.S. PATENT DOCUMENTS

| | | | |
|---|---|---|---|
| 9,438,350 B1* | 9/2016 | Schmidt | H04B 10/50572 |
| 2013/0278744 A1* | 10/2013 | Debarre | G02B 21/06 |
| | | | 348/79 |
| 2022/0021462 A1* | 1/2022 | Rashidinejad | H04B 10/548 |

FOREIGN PATENT DOCUMENTS

| | | |
|---|---|---|
| CN | 109655665 A | 4/2019 |
| CN | 110244105 A | 9/2019 |
| CN | 117973063 A | 5/2024 |

\* cited by examiner

*Primary Examiner* — Mohamed Charioui
(74) *Attorney, Agent, or Firm* — WCF IP

(57) ABSTRACT

This application relates to the field of electrical technologies, and provides a full even harmonic digital demodulation method based on full-phase analysis for a magnetic modulator. According to the full even harmonic digital demodulation method based on full-phase analysis for a magnetic modulator, standard voltage timing data output by the magnetic modulator is obtained when a DC calibration current with a set amplitude is fed into the magnetic modulator during calibration of the magnetic modulator; an output voltage sequence from full-phase Fourier analysis is established based on the standard voltage sequence data, and the output voltage sequence is preprocessed; comprehensive analysis is performed on the preprocessed output voltage sequence from full-phase Fourier analysis to obtain all standard even harmonic signals and current conversion coefficients.

9 Claims, 2 Drawing Sheets

DIGITAL FULL EVEN HARMONIC DEMODULATION METHOD BASED ON FULL-PHASE ANALYSIS FOR MAGNETIC MODULATOR

CROSS REFERENCE TO RELATED APPLICATION

This patent application claims the benefit and priority of Chinese Patent Application No. 202411061476.6, filed with the China National Intellectual Property Administration on Aug. 5, 2024, the disclosure of which is incorporated by reference herein in its entirety as part of the present application.

TECHNICAL FIELD

The present disclosure relates to the field of electrical technologies, and in particular, to a full even harmonic digital demodulation method based on full-phase analysis for a magnetic modulator.

BACKGROUND

With the continuous improvement of voltage level, faults caused by insulation defects in high-voltage direct current (HVDC) devices are becoming increasingly prominent, seriously restricting the safe and stable operation of HVDC transmission systems. Currently, the progress in online monitoring technology for the insulation status of HVDC devices is slow. This is mainly because the leakage current in the HVDC devices is relatively extreme, with the most critical DC leakage current being extremely small, only at the level of 10 μA in normal insulation conditions, rendering existing non-contact current sensing technologies inadequate.

Non-contact DC sensing technologies primarily include Hall current sensors, magnetoresistive current sensors, and magnetic modulation current sensors. Among these, magnetic modulators offer advantages such as high resolution, high sensitivity, high precision, minimal temperature drift, and stable working characteristics, being well-suited for measuring DC currents at the level of 10 μA.

However, current magnetic modulators typically achieve non-contact measurement of DC currents at the level of 100 μA. The main challenges affecting the measurement accuracy in demodulation are as follows: Even with a double-core differential sensing structure in the magnetic modulator, the odd harmonic components of the output voltage may be significantly larger than the even harmonic components due to discrepancies in the magnetic characteristics of the two cores.

Spectral leakage from odd harmonics impairs the monitoring accuracy of even harmonics. Additionally, the inherent asymmetry in the hysteresis loop of the magnetic core material introduces zero-offset noises at the μA level, which severely affects the measurement accuracy of DC signals at the level of 10 μA. Therefore, there is an urgent need for a high-accuracy digital demodulation method for magnetic modulators to reduce the impact of spectrum leakage from odd harmonics and zero-offset noises, laying a foundation for improving measurement accuracy.

SUMMARY

To address the shortcomings of the prior art, the present disclosure provides a full even harmonic digital demodulation method based on full-phase analysis for a magnetic modulator. The method resolves the following issues: Even with a double-core differential sensing structure in the magnetic modulator, the odd harmonic components of the output voltage may be significantly larger than the even harmonic components due to discrepancies in the magnetic characteristics of the two cores. Spectral leakage from odd harmonics impairs the monitoring accuracy of even harmonics. Additionally, the inherent asymmetry in the hysteresis loop of the magnetic core material introduces zero-offset noises at the μA level, which severely affects the measurement accuracy of DC signals at the level of 10 μA.

In order to achieve the above objectives, the present disclosure adopts the following technical solutions: A full even harmonic digital demodulation method based on full-phase analysis for a magnetic modulator includes the following steps: Standard voltage timing data output by the magnetic modulator when a DC calibration current with a set amplitude is fed into the magnetic modulator during calibration of the magnetic modulator is obtained, where the standard voltage timing data includes standard output voltage signal values at a plurality of time points. Specifically, an output voltage analog signal of the magnetic modulator is converted into a digital signal by using a digital collection device. An output voltage sequence from full-phase Fourier analysis is established based on the standard voltage timing data, and is preprocessed. Comprehensive analysis is performed on the preprocessed output voltage sequence from full-phase Fourier analysis, to obtain all standard even harmonic signals and current conversion coefficients. To-be-measured weak voltage timing data output by the magnetic modulator when a to-be-measured weak DC signal current is fed into the magnetic modulator after the calibration of the magnetic modulator is obtained, and comprehensive analysis is performed to obtain all to-be-measured weak even harmonic signals, where the to-be-measured weak voltage timing data includes to-be-measured weak output voltage signal values at a plurality of time points. Specifically, an output voltage analog signal of the magnetic modulator is converted into a digital signal by using the digital collection device. Comprehensive analysis is performed on all the to-be-measured weak even harmonic signals and the current conversion coefficients, to obtain a full even harmonic detection signal. A measurement value of the to-be-measured weak DC signal current is analyzed based on the full even harmonic detection signal.

Further, said establishing an output voltage sequence from full-phase Fourier analysis specifically includes: selecting standard output voltage signal values at $2N_a-1$ time points from preprocessed standard voltage timing data of the magnetic modulator, to establish the output voltage sequence from full-phase Fourier analysis. An expression of the output voltage sequence from full-phase Fourier analysis is as follows:

$U_d=[u_d(0), u_d(1), \ldots, u_d(2N_a-1)]^T$, where $U_d$ is the output voltage sequence from full-phase Fourier analysis, $u_d(0)$ is a standard output voltage signal value at a first time point in the output voltage sequence from full-phase Fourier analysis, $u_d(1)$ is a standard output voltage signal value at a second time point in the output voltage sequence from full-phase Fourier analysis, and $u_d(2N_a-1)$ is a standard output voltage signal value at a last time point in the output voltage sequence from full-phase Fourier analysis.

Further, said preprocessing the output voltage sequence from full-phase Fourier analysis specifically includes: establishing a Hamming window function sequence, and performing convolution analysis to obtain a convolution window sequence; and performing comprehensive analysis on the output voltage sequence from full-phase Fourier analysis and the convolution window sequence, to obtain a sequence after full-phase preprocessing.

Further, said obtaining a convolution window sequence specifically includes: establishing a Hamming window function sequence with a length $N_a$, and performing convolution operation on the Hamming window function sequence with the same sequence, to obtain a $(2N_a-1)$-dimensional convolution window sequence. A specific formula is as follows:

$$\begin{cases} HW(n) = 0.54 - 0.46 * \cos\left(\frac{2*\pi*n}{N_a}\right), \\ GW = HW * HW \end{cases}$$

where $HW(n)$ is a value of a Hamming window function at an index n, $\pi$ is a natural constant, n is a sample index in a Hamming window, $n=0, 1, 2, \ldots, N_a-1$, $N_a$ is the length of the Hamming window, GW is the convolution window sequence, and HW is the Hamming window function sequence.

Further, said obtaining a sequence after full-phase preprocessing specifically includes: multiplying the output voltage sequence with the convolution window sequence term-by-term, to obtain a new data sequence, and adding a $k^{th}$ term and a $(N_s+k)^{th}$ term in the new data sequence sequentially, to obtain the sequence after full-phase preprocessing:

$$\begin{cases} y = U_d * GW \\ U_{ap} = \frac{1}{N_a} * [y(N_a), y(1) + y(N_a + 1), \ldots, y(N_a - 1) + y(2N_a - 1)]^T \end{cases},$$

where Y is the new data sequence, $U_d$ is the output voltage sequence, GW is the convolution window sequence, $U_{ap}$ is the sequence after full-phase preprocessing, $y(N_a)$, $y(1)$, $y(N_a+1)$, $y(N_a-1)$, and $y(2N_a-1)$ are corresponding terms in the new data sequence, and $N_a$ is the length of the Hamming window.

Further, said obtaining all standard even harmonic signals specifically includes: performing Fourier analysis on the sequence after full-phase preprocessing to obtain a total harmonic characteristic of a standard output voltage signal, and analyzing all the standard even harmonic signals accordingly. The total harmonic characteristic of the standard output voltage signal is as follows:

$$u_d(t) = \sum_{i=1}^{N} [U_{d,i} * \cos(i * \omega_e * t + \varphi_i)],$$

where $U_{d,i}$ and $\varphi_i$ are respectively an amplitude and a phase of an i-order harmonic, $\omega_e$ is fundamental angular frequency of a square wave excitation source, $i=1, 2, 3, \ldots, L$, and L is a total number of harmonic orders.

Further, a specific phasor expression of each even harmonic signal is as follows: $\dot{U}_{d,i} = U_{d,i}\angle\varphi_i = U_{dr,i}\angle\varphi_{dr,i} + U_{z,i}\angle\varphi_{z,i}$, where $\dot{U}_{d,i}$ is each even harmonic signal, $U_{d,i}$ and $\varphi_i$ are the amplitude and phase of the i-order harmonic, $U_{dr,i}$ and $\varphi_{dr,i}$ are an amplitude and a phase of a real even harmonic caused by a DC current, $U_{z,i}$ and $\varphi_{z,i}$ are zero-offset noises of each even harmonic, $i=1, 2, 3, \ldots, L$, and L is the total number of harmonic orders.

Further, the current conversion coefficient is obtained by analyzing each standard even harmonic signal and the DC calibration current, and a specific formula is as follows:

$$K_i = \frac{|\dot{U}_{d,i}|}{I_{ca}},$$

where $K_i$ is a current conversion coefficient of the i-order harmonic, $\dot{U}_{d,i}$ is an even harmonic signal of the i-order harmonic, $i=1, 2, 3, \ldots, L$, and L is the total number of harmonic orders.

Further, a specific expression of the full even harmonic detection signal is as follows:

$$\dot{U}_{even} = \frac{K_2}{K_2} * \dot{U}'_{d,2} + \frac{K_2}{K_4} * \dot{U}'_{d,4} + \ldots + \frac{K_2}{K_{N_2}} * \dot{U}'_{d,N_2},$$

where $\dot{U}_{even}$ is the full even harmonic detection signal, $N_2$ is a highest-order even harmonic set during full even harmonic demodulation, $K_{N_2}$ is a current conversion coefficient for the highest-order even harmonic set in full even harmonic demodulation, and $\dot{U}'_{d,N_2}$ is a to-be-measured weak even harmonic signal for the highest-order even harmonic set in full even harmonic demodulation.

Further, a specific formula for analyzing the measurement value of the to-be-measured weak DC signal current is as follows:

$$I_m = \frac{2 * |\dot{U}_{even}|}{N_2 * K_2},$$

where $I_m$ is the measurement value of the to-be-measured weak DC signal current, $\dot{U}_{even}$ is the full even harmonic detection signal, and $N_2$ is the highest-order even harmonic set in full even harmonic demodulation.

The present disclosure has the following beneficial effects:

(1) The full even harmonic digital demodulation method based on full-phase analysis for a magnetic modulator adopts the full-phase Fourier analysis technology to perform comprehensive preprocessing and analysis on the output voltage signals of the magnetic modulator. This approach significantly reduces spectrum leakage and phase distortion, ensuring that data sampled at different time points can be fully utilized and enhancing the accuracy of signal processing. Particularly, by applying the Hamming window function and the convolution window sequence for preprocessing, abrupt changes in signal boundaries are effectively smoothed, thereby reducing the edge effects on spectrum analysis, thereby improving the accuracy and reliability of measurement results.

(2) The full even harmonic digital demodulation method based on full-phase analysis for a magnetic modulator effectively mitigates the impact of zero-offset noises by leveraging the phase unity of all the real even harmonics and the phase dispersion of zero-offset noises in all the even harmonics caused by DC calibration current, and by calculating the current conversion coefficients and the even harmonic detection signals. The method significantly improves measurement sensitivity and accuracy, particularly in weak signal detection, for example, measurement of a 10 μA level DC signal, which is crucial for high-precision measurement devices, especially in HVDC transmission systems.

(3) The full even harmonic digital demodulation method based on full-phase analysis for a magnetic modulator excels in extracting useful components from weak signals by comprehensively analyzing the full even harmonic detection signal and accurately calculating with the current conversion coefficients. This helps avoid measurement errors due to insufficient device sensitivity. By analyzing full-phase harmonic characteristics of the to-be-measured weak DC signal current, the method can accurately detect changes in weak signals even in high-noise environments. This high-sensitivity measurement capability is crucial for accurately monitoring and evaluating the operational state of devices in modern power systems, enabling timely detection and warning of potential faults.

Certainly, the implementation of any product in the present disclosure does not necessarily need to achieve all of the above advantages.

DESCRIPTION OF THE EMBODIMENTS

Embodiments of the present disclosure provide a full even harmonic digital demodulation method based on full-phase analysis for a magnetic modulator in the magnetic modulator, to resolve the following issues: Even with a double-core differential sensing structure, the odd harmonic components of the output voltage may be significantly larger than the even harmonic components due to discrepancies in the magnetic characteristics of the two cores. Spectral leakage from odd harmonics impairs the monitoring accuracy of even harmonics. Additionally, the inherent asymmetry in the hysteresis loop of the magnetic core material introduces zero-offset noises at the μA level, which severely affects the measurement accuracy of DC signals at the level of 10 μA.

A general idea of the embodiments of this application is as follows:

A DC calibration current with a set amplitude is fed into the magnetic modulator, standard voltage timing data output by the magnetic modulator is obtained, and an output voltage analog signal is converted into a digital signal by using a digital collection device, to obtain a standard output voltage signal value. An output voltage sequence from full-phase Fourier analysis is established and preprocessed: An output voltage sequence from full-phase Fourier analysis is established based on the standard voltage timing data, and the output voltage sequence is preprocessed. Specifically, a Hamming window function sequence is established and convolution analysis is performed to obtain a convolution window sequence; comprehensive analysis is performed on the output voltage sequence and the convolution window sequence to obtain a sequence after full-phase preprocessing. Fourier analysis is performed and current conversion coefficients are calculated. Specifically, Fourier analysis is performed on the sequence after full-phase preprocessing to obtain all standard even harmonic signals; the current conversion coefficient for conversion between each standard even harmonic signal and the DC calibration current is calculated. A to-be-measured signal is obtained and analyzed. Specifically, a to-be-measured weak DC signal current is fed into the magnetic modulator, to obtain to-be-measured weak voltage timing data, and an output voltage analog signal is converted into a digital signal by using the digital collection device to obtain a to-be-measured weak output voltage signal value. A full even harmonic detection signal and a to-be-measured current are calculated. Specifically, comprehensive analysis is performed on each to-be-measured weak even harmonic signal and the current conversion coefficient, to obtain the full even harmonic detection signal, and a measurement value of the to-be-measured weak DC signal current is calculated based on the full even harmonic detection signal.

Figure 1:
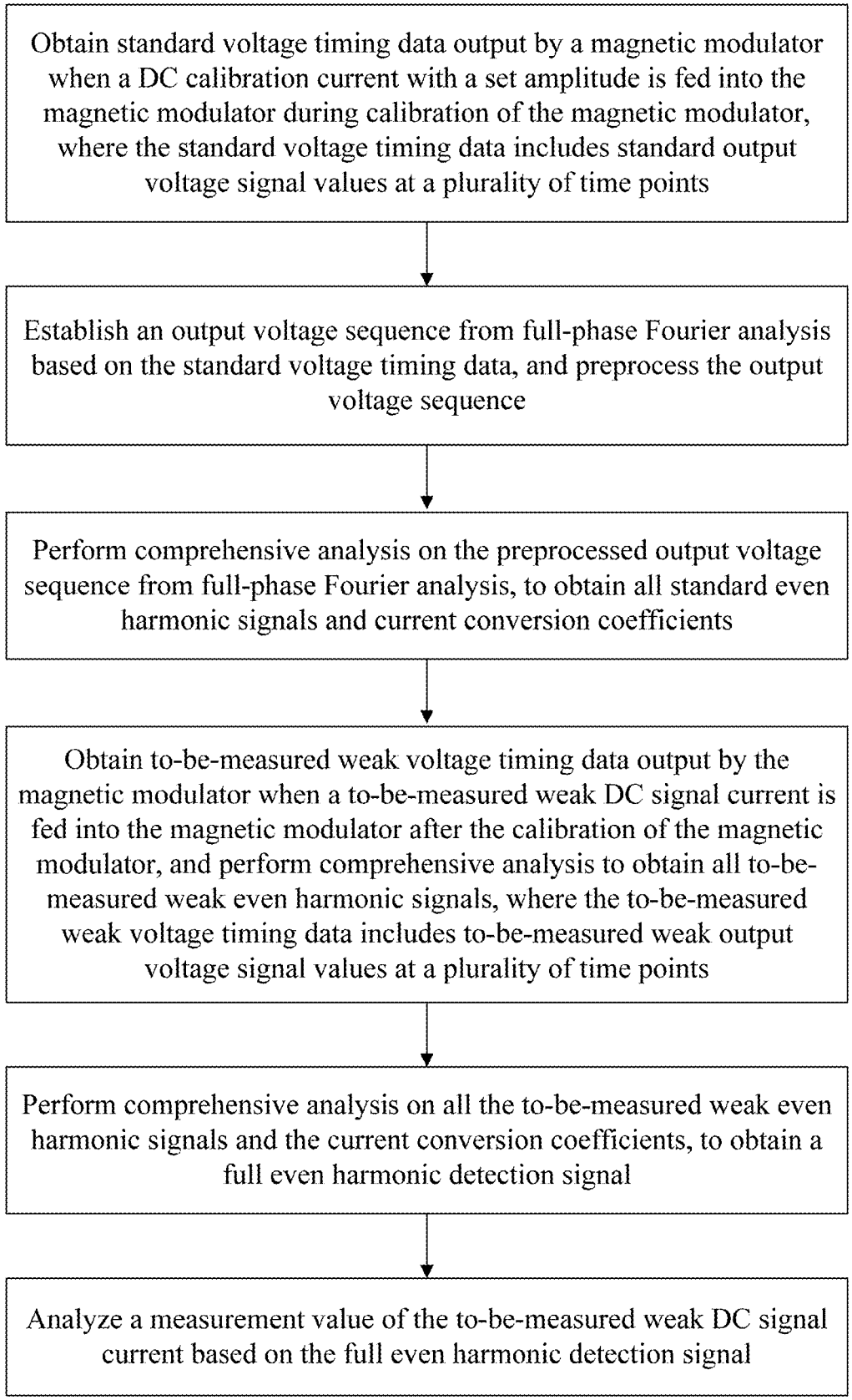
FIG. 1 is a flow chart of a full even harmonic digital demodulation method based on full-phase analysis for a magnetic modulator according to the present disclosure.

Referring to FIG. 1, an embodiment of the present disclosure provides a technical solution as follows: A full even harmonic digital demodulation method based on full-phase analysis for a magnetic modulator includes the following steps: Standard voltage timing data output by the magnetic modulator when a DC calibration current with a set amplitude is fed into the magnetic modulator during calibration of the magnetic modulator is obtained. The standard voltage timing data includes standard output voltage signal values at a plurality of time points. Specifically, an output voltage analog signal of the magnetic modulator is converted into a digital signal by using a digital collection device. An output voltage sequence from full-phase Fourier analysis is established based on the standard voltage timing data, and is preprocessed. Comprehensive analysis is performed on the preprocessed output voltage sequence from full-phase Fourier analysis, to obtain all standard even harmonic signals and current conversion coefficients. To-be-measured weak voltage timing data output by the magnetic modulator when a to-be-measured weak DC signal current is fed into the magnetic modulator after the calibration of the magnetic modulator is obtained, and comprehensive analysis is performed. Specifically, the establishing step and preprocessing step are performed on the output voltage sequence from full-phase Fourier analysis, and a comprehensive analysis step is performed on the preprocessed output voltage sequence from full-phase Fourier analysis. All to-be-measured weak even harmonic signals are obtained, where the to-be-measured weak voltage timing data includes to-be-measured weak output voltage signal values at a plurality of time points. Specifically, the output voltage analog signal of the magnetic modulator is converted into the digital signal by using the digital collection device. Comprehensive analysis is performed on all the to-be-measured weak even harmonic signals and the current conversion coefficients, to obtain a full even harmonic detection signal. A measurement value of the to-be-measured weak DC signal current is analyzed based on the full even harmonic detection signal.

Specifically, said establishing an output voltage sequence from full-phase Fourier analysis specifically includes: selecting standard output voltage signal values at $2N_a-1$ time points from preprocessed standard voltage timing data of the magnetic modulator, to establish the output voltage sequence from full-phase Fourier analysis. A specific expression of the output voltage sequence from full-phase Fourier analysis is as follows: $U_d=[u_d(0), u_d(1), u_d(2N_a-1)]^T$. $U_d$ is the output voltage sequence from full-phase Fourier analysis, $u_d(0)$ is a standard output voltage signal value at a first time point in the output voltage sequence from full-phase Fourier analysis, $u_d(1)$ is a standard output voltage signal value at a second time point in the output voltage sequence from full-phase Fourier analysis, and $u_a(2N_a-1)$ is a standard output voltage signal value at the last time point in the output voltage sequence from full-phase Fourier analysis.

In this embodiment, the accuracy of spectrum analysis can be greatly enhanced by establishing the output voltage sequence from full-phase Fourier analysis. Full-phase Fourier analysis is performed on the preprocessed voltage signal data, such that spectrum leakage caused by signal edge effects can be reduced. Specifically, full-phase processing on the standard output voltage signal values ensures that signals at all time points are fully utilized, enabling the Fourier transform results more accurate. This is crucial for high-precision signal analysis and detection, particularly when dealing with weak signals, significantly improving detection sensitivity and reliability. Establishing the output voltage sequence from full-phase Fourier analysis enhances the robustness of signal processing. The full-phase Fourier analysis method takes into account the signal phase information at different time points, making the entire signal processing process more resistant to noises and interference. The method better captures the essential characteristics of the signal, especially in the presence of zero-offset noises. Through comprehensive analysis and preprocessing, the impact of noises on signal measurement can be effectively suppressed, thereby improving the overall stability and reliability of the signal processing system. This method provides a solid foundation for subsequent harmonic analysis and current measurement. Establishing the output voltage sequence from full-phase Fourier analysis helps accurately extract harmonic components, particularly even harmonics. In subsequent steps, the current value of the weak DC signal is measured precisely through Fourier analysis and calculation of the current conversion coefficients. The optimized signal processing flow not only enhances measurement accuracy but also simplifies measurement procedures, making the entire process more efficient and reliable, being well-suited for high-precision current detection applications.

Specifically, said preprocessing the output voltage sequence from full-phase Fourier analysis specifically includes: establishing a Hamming window function sequence, and performing convolution analysis to obtain a convolution window sequence; and performing comprehensive analysis on the output voltage sequence from full-phase Fourier analysis and the convolution window sequence, to obtain a sequence after full-phase preprocessing.

In this embodiment, spectrum leakage in signal processing can be effectively mitigated by establishing a Hamming window function and applying convolution analysis. The Hamming window function smooths the signal boundaries, thereby reducing the spectrum leakage effect caused by window truncation. The convolution window sequence further enhances this effect, resulting in more accurate spectrum analysis from the Fourier transform. This preprocessing method ensures that the signal representation in the frequency domain is closer to the actual situation, significantly improving the reliability of results by reducing errors caused by edge effects, particularly in high-precision measurement and analysis. The preprocessing step of full-phase Fourier analysis, including convolution analysis with the Hamming window, enhances the robustness of signal processing. The Hamming window function helps reduce high-frequency noises and edge effects, making the processed signal smoother and easier to analyze. After full-phase preprocessing, the sequence retains the key characteristics of the signal while suppressing noises and interference, leading to more accurate Fourier analysis and harmonic extraction. This method is especially suitable for precise signal measurement in high-noise environments, improving the stability and reliability of the entire system. Following preprocessing and convolution analysis with the Hamming window function, the output voltage sequence from full-phase Fourier analysis is smoothed, eliminating many interference factors. Such preprocessing optimizes subsequent harmonic analysis and current measurement. The preprocessed signal is clearer, making it easier to identify and analyze harmonic components. Consequently, the current conversion coefficient can be calculated more accurately, and even harmonic signals can be extracted. This approach not only improves measurement accuracy but also simplifies the signal processing, making the entire measurement process more efficient and reliable, especially for high-precision current detection applications, such as the precise measurement of weak DC signals.

Specifically, said obtaining a convolution window sequence specifically includes: establishing a Hamming window function sequence with a length $N_a$, and performing convolution operation on the Hamming window function sequence with the same sequence, to obtain a $(2N_a-1)$-dimensional convolution window sequence. A specific formula is as follows:

$$\begin{cases} HW(n) = 0.54 - 0.46 * \cos\left(\dfrac{2*\pi*n}{N_a}\right) \\ GW = HW * HW \end{cases}.$$

HW(n) is a value of a Hamming window function at an index n, $\pi$ is a natural constant, n is a sample index in a Hamming window, n=0, 1, 2, ..., $N_a-1$, $N_a$ is the length of the Hamming window, GW is the convolution window sequence, and HW is the Hamming window function sequence.

In this embodiment, the Hamming window function sequence effectively reduces spectrum leakage in the Fourier transform through the specialized weighting method. Additionally, the convolution window sequence smooths the signal further, significantly diminishing the impact of edge effects on the spectrum. This smoothing process ensures that the signal representation in the frequency domain is more accurate and reduces the false frequency phenomenon caused by signal truncation, which is crucial for applications requiring high-precision spectrum analysis, such as precise current measurement and signal processing. The convolution window sequence enhances the robustness of signal processing by applying convolution with the Hamming window function sequence. This processing method effectively suppresses high-frequency noises and edge effects, resulting in a smoother and more stable processed signal. When combined with full-phase Fourier analysis, the convolution window sequence captures the essential characteristics of the signal more effectively, especially in noisy and interference-prone environments, thereby improving the anti-interference capability of signal processing and enhancing the overall stability and reliability of the system. By preprocessing the output voltage sequence from full-phase Fourier analysis, harmonic components in the signals can be extracted more accurately with the convolution window sequence. The application of the convolution window sequence clarifies the harmonic characteristics of the signal, making the characteristics easier to analyze. Consequently, the current conversion coefficients can be calculated with greater accuracy, and even harmonic signals can be extracted. This optimization not only improves measurement accuracy but also simplifies the signal processing, making the entire measurement process more efficient and reliable, particularly for the precise measurement of weak DC signals and high-precision current detection.

Specifically, said obtaining a sequence after full-phase preprocessing specifically includes: multiplying the output voltage sequence and the convolution window sequence term-by-term, to obtain a new data sequence, and adding a $k^{th}$ term and a $(N_s+k)^{th}$ term in the new data sequence sequentially, to obtain the sequence after full-phase preprocessing:

$$\begin{cases} y = U_d * GW \\ U_{ap} = \dfrac{1}{N_a} * [y(N_a), y(1) + y(N_a + 1), \ldots, y(N_a - 1) + y(2N_a - 1)]^T \end{cases}.$$

y is the new data sequence, $U_d$ is the output voltage sequence, GW is the convolution window sequence, $U_{ap}$ is the sequence after full-phase preprocessing, $y(N_a)$, $y(1)$, $y(N_a+1)$, $y(N_a-1)$, and $y(2N_a-1)$ are corresponding terms in the new data sequence, and $N_a$ is the length of the Hamming window. 1 to $2N_a-1$ cover the whole processed window function sequence, and $N_s \leq N_a$.

In this embodiment, by multiplying the output voltage sequence with the convolution window sequence term by term, the frequency and time domain characteristics of the signal are effectively fused, and spectrum leakage caused by edge effects is reduced. This processing method enhances the accuracy of Fourier transform results because each data point in the signal is smoothed, thereby reducing the influence of high-frequency noises and other interferences and improving precision and reliability of signal processing. This is crucial for high-precision current measurement and signal analysis, especially in scenarios requiring high accuracy. The robustness of the signal is significantly improved through the sequence after full-phase preprocessing. Term-by-term multiplication and addition ensure that every part of the signal is thoroughly considered, resulting in a smoother and more stable processed signal. This approach better captures the essential characteristics of the signal and reduces the impact of noises and interference. In cases of zero-offset noises, this method effectively suppresses interference of noises on signal measurement, thereby improving the overall stability and anti-interference capability of the system. The preprocessing steps of term-by-term multiplication and addition on the output voltage sequence and convolution window sequence optimize subsequent harmonic analysis and current measurement. The sequence after full-phase preprocessing more clearly reflects the harmonic characteristics of the signal, allowing the Fourier transform to extract harmonic components with greater accuracy. This optimization not only enhances the accuracy of harmonic analysis but also simplifies signal processing, making the measurement process more efficient and reliable. This method is particularly suitable for the accurate measurement of weak DC signals and high-precision current detection. By using this preprocessing method, the current conversion coefficient can be calculated more accurately, thereby improving the sensitivity and accuracy of current measurement.

Specifically, said obtaining all standard even harmonic signals specifically includes: performing Fourier analysis on the sequence after full-phase preprocessing to obtain a total harmonic characteristic of a standard output voltage signal, and analyzing all the standard even harmonic signals accordingly, where the total harmonic characteristic of the standard output voltage signal is as follows:

$$u_d(t) = \sum_{i=1}^{N} [U_{d,i} * \cos(i * \omega_e * t + \varphi_i)].$$

$U_{d,i}$ and $\varphi_i$ are respectively an amplitude and a phase of an i-order harmonic, t is the variable of time point, $\omega_e$ is fundamental angular frequency of a square wave excitation source, i=1, 2, 3, ..., L, and L is a total number of harmonic orders.

In this embodiment, the frequency components of the signal, including the amplitude and phase of each harmonic, can be accurately extracted through Fourier analysis on the sequence after full-phase preprocessing. This extraction method ensures that the subtle characteristics of the signal are captured at different frequencies, particularly in complex signals with a plurality of harmonic components. With this analysis approach, even harmonic signals can be accurately identified and separated, contributing to a deeper understanding of the frequency characteristics and dynamic changes of signals while improving the accuracy and reliability of spectrum analysis. The full-phase Fourier analysis method significantly enhances the sensitivity of harmonic analysis. The signal sequence after full-phase preprocessing retains complete phase information and reduces the impact of edge effects, allowing Fourier analysis to detect weak harmonic components more sensitively. This high-sensitivity analysis is crucial for detecting and analyzing the harmonic characteristics of weak DC signals, ultimately helping to improve the accuracy of signal measurement. Especially in applications involving low current measurement and high-precision signal analysis, this method allows for a more accurate description of the total harmonic characteristic of signals by extracting the amplitude and phase of each standard even harmonic signal. This approach effectively suppresses the influence of noises and interference on signal measurement, ensuring the stability and reliability of measurement results. Additionally, full-phase Fourier analysis combined with Hamming window preprocessing effectively addresses the edge effects of the signal, reducing spectrum leakage and phase disorder while improving signal measurement accuracy. This processing method is particularly suitable for high-precision current detection and weak signal analysis, significantly enhancing the overall performance and reliability of the measurement system.

Specifically, a specific phasor expression of each even harmonic signal is as follows: $\dot{U}_{d,i}=U_{d,i}\angle\varphi_i=U_{dr,i}\angle\varphi_{dr,i}+U_{z,i}\angle\varphi_{z,i}$, is each even harmonic signal, $U_{d,i}$ and $\varphi_i$ are the amplitude and phase of the i-order harmonic, $U_{dr,i}$ and $\varphi_{dr,i}$ are an amplitude and a phase of a real even harmonic caused by a DC current, $U_{z,i}$ and $\varphi_{z,i}$ are zero-offset noises of each even harmonic, i=1, 2, 3, ..., L, and L is the total number of harmonic orders.

In this embodiment, useful information and noises in the signal can be separated more accurately by decomposing the even harmonic signal into the real even harmonic component and the zero-offset noise component. The real even harmonic component represents the effective signal caused by the DC current, while the zero-offset noise component represents the noise interference in the signal. This separation method effectively suppresses the impact of noises in signal processing, thereby improving measurement accuracy and reliability, especially in weak signal detection and high-precision measurement. Analyzing the phasor of each even harmonic signal enhances the robustness and stability of signal processing. The phasor expression provides amplitude and phase information of the signal, enabling accurate capture of the real characteristics of the signal even in the presence of noises and interference. The phasor expression distinguishes the unity of amplitude and phase of the real even harmonic component from the phase dispersion of the zero-offset noises, such that noise interference in signal processing can be effectively suppressed, ensuring the stability and consistency of the processing results. The phasor expression of each even harmonic signal improves harmonic analysis and current measurement accuracy. Decomposing the real harmonic component and the noise component allows for more precise extraction and analysis of harmonic characteristics, leading to a more accurate current conversion coefficient. This method not only enhances the accuracy of harmonic analysis but also optimizes current measurement processes. As a result, weak DC signals can be measured more accurately in high-precision current detection applications, improving the overall performance and reliability of the measurement system.

Specifically, the current conversion coefficient is obtained by analyzing each standard even harmonic signal and the DC calibration current, and a specific formula is as follows:

$$K_i = \frac{|\dot{U}_{d,i}|}{I_{ca}}.$$

$K_i$ is a current conversion coefficient of the i-order harmonic, $\dot{U}_{d,i}$ is an even harmonic signal of the i-order harmonic, i=1, 2, 3, .... L, and L is the total number of harmonic orders.

In this embodiment, the voltage signal of each harmonic can be converted into the corresponding current signal by calculating the current conversion coefficient. This ensures the accuracy of signal measurement because the current conversion coefficient is derived from the known calibration current and the measured harmonic signal. The calibration process eliminates the influence of devices errors and environmental factors on the measurement results, thereby enhancing the accuracy of current measurement. This is particularly crucial in weak signal detection, during which small errors can significantly affect the results. By introducing the current conversion coefficient, the analysis of complex signals can be simplified. After converting to current signals, harmonic signals can be compared and analyzed more intuitively. This is especially useful when a plurality of harmonic components coexist. Using the conversion coefficients to normalize signals with different frequency components helps in accurately identifying and separating various harmonic components, thereby simplifying signal processing and analysis steps and improving processing efficiency. The calculation of the current conversion coefficient is based on the standard even harmonic signal and the DC calibration current, which ensures the robustness and stability of the measurement system. Through the calibration process, nonlinearity and drift in the system can be compensated, making the measurement results more stable and reliable. Additionally, the introduction of the current conversion coefficient provides consistent conversion standards across different measurement conditions, reducing the impact of environmental changes and improving the overall performance of the system. This is particularly critical for high-precision current detection and long-term monitoring applications, as the measurement system maintains high consistency and reliability under various operating conditions.

Specifically, a specific expression of the full even harmonic detection signal is as follows:

$$\dot{U}_{even} = \frac{K_2}{K_2} * U'_{d,2} + \frac{K_2}{K_4} * U'_{d,4} + \ldots + \frac{K_2}{K_{N_2}} * U'_{d,N_2}.$$

$\dot{U}_{even}$ is the full even harmonic detection signal, $N_2$ is a highest-order even harmonic set during full even harmonic demodulation, $K_{N_2}$ is a current conversion coefficient for the highest-order even harmonic set in the full even harmonic demodulation, $\dot{U}_{d,N_2}$ is a to-be-measured weak even harmonic signal for the highest-order even harmonic set in the full even harmonic demodulation.

In this embodiment, the contribution of even harmonic signals at different orders to the total signal can be comprehensively assessed using the calculation method for the full even harmonic detection signal. Each even harmonic signal is normalized according to the current conversion coefficient and then accumulated to obtain the full even harmonic detection signal. This approach eliminates amplitude differences between different frequency components, enhancing the accuracy and stability of signal detection, especially in complex signal environments. As a result, the target signal can be identified and extracted more accurately, improving the sensitivity and reliability of the measurement. By calculating the full even harmonic detection signal, the impact of zero-offset noises on signal detection can be significantly reduced. Zero-offset noises typically affect measurement accuracy, particularly in weak signal detection. Normalizing even harmonic signals and performing weighted accumulation effectively suppresses noise interference, thereby improving the robustness and anti-interference capability of the measurement system. This method ensures that weak signals can be accurately detected even in high-noise environments. Additionally, the calculation method for the full even harmonic detection signal optimizes the signal processing flow, enhances measurement efficiency, and simplifies processing steps. Normalizing, weighting, and accumulating even harmonic signals not only simplify signal processing steps, but also improve data processing speed and efficiency. The calculation result of the full even harmonic detection signal can be directly used for subsequent current measurement and signal analysis, reducing complexity of intermediate steps. This optimization is suitable for real-time monitoring and efficient measurement applications, improving system response speed and ensuring rapid acquisition of high-precision measurement results.

Specifically, a specific formula for analyzing the measurement value of the to-be-measured weak DC signal current is as follows:

$$I_m = \frac{2 * |\dot{U}_{even}|}{N_2 * K_2}.$$

$I_m$ is the measurement value of the to-be-measured weak DC signal current, $\dot{U}_{even}$ is the full even harmonic detection signal, and $N_2$ is the highest-order even harmonic set in the full even harmonic demodulation.

In this embodiment, using this formula to calculate the measurement value of the to-be-measured weak DC signal current significantly improves the accuracy and sensitivity of weak signal measurement. The absolute value of the full even harmonic detection signal reflects the strength of the effective harmonic component in the signal, allowing for precise extraction of the effective current component from the weak signal through normalization and weighting. This method is particularly effective for detecting and measuring weak DC signals. In high-precision measurements, the accuracy of measurement results can be ensured. The formula can simplify the measurement process and improve the measurement efficiency by calculation with the full even harmonic detection signal and the current conversion coefficients of the set highest-order even harmonic and the second-order even harmonic. The formula directly converts the full even harmonic detection signal to the measurement value of the actual current, bypassing complex intermediate steps and calculations. This streamlined approach enhances system response speed and efficiency, being suitable for real-time monitoring and high-efficiency applications. Normalizing the full even harmonic detection signal helps effectively suppress the impact of noises and interference on the measurement result, improving the stability and reliability of the measurement system. In high-noise environments, the measurement value calculated using the formula maintains high accuracy and consistency. The full even harmonic detection signal synthesizes information from harmonics at a plurality of orders, and the normalized current conversion coefficient and the highest-order even harmonic are used, such that the robustness and anti-interference ability of the measurement system are further enhanced, ensuring reliable results under various conditions.

Figure 2:
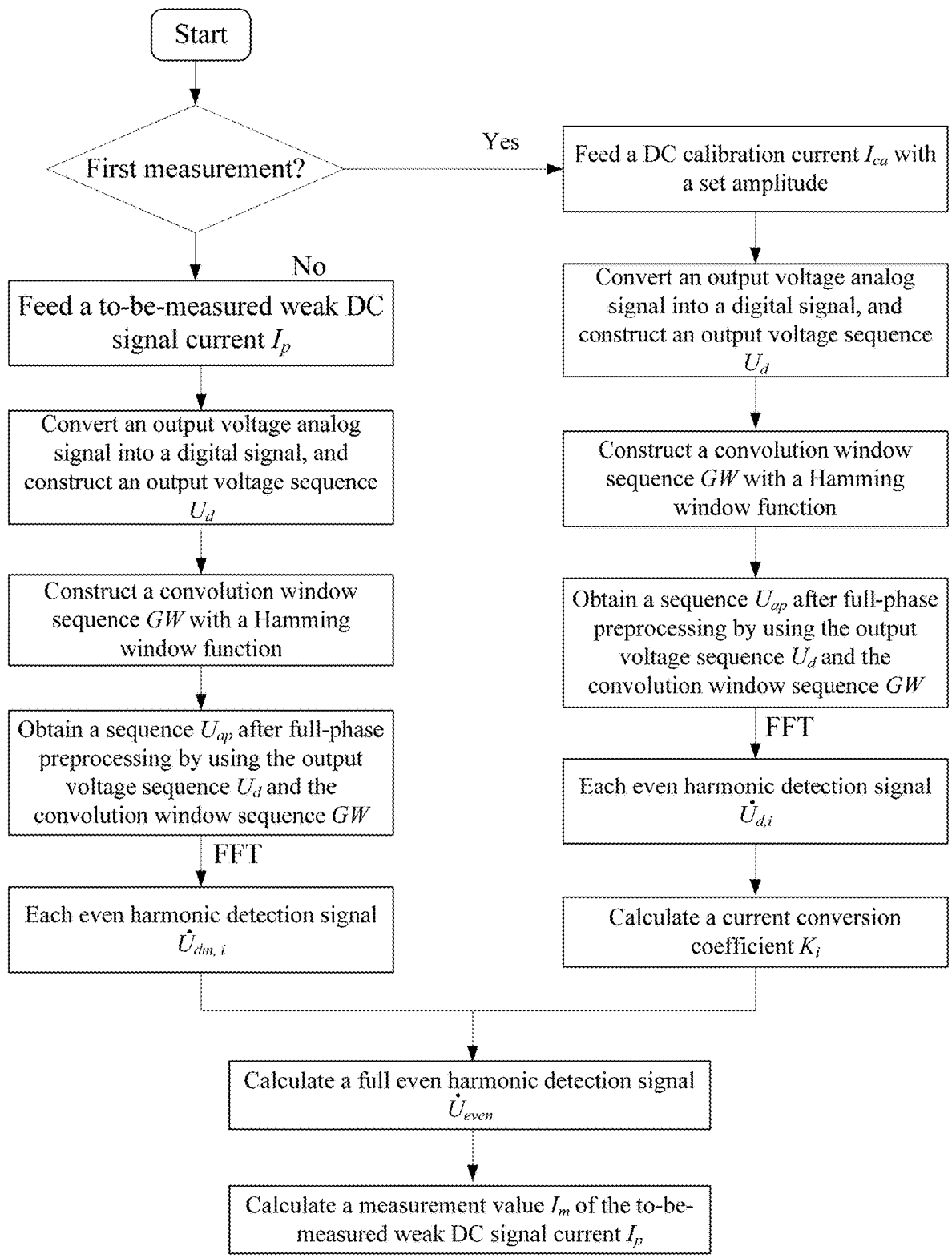
FIG. 2 is an embodiments flow chart of a full even harmonic digital demodulation method based on full-phase analysis for a magnetic modulator according to the present disclosure.

Referring to FIG. 2, a specific example of a full even harmonic digital demodulation method based on full-phase analysis for a magnetic modulator is as follows:

Step 1: During first measurement, a 10 mA DC calibration current $I_{ca}$ is feed into the magnetic modulator.

Step 2: An output voltage analog signal is converted into a digital signal by a digital collection device, to obtain timing data of an output voltage signal, and an output voltage sequence $U_d$ from full-phase Fourier analysis is constructed by using 19999 pieces of timing data.

Step 3: A Hamming window function sequence HW with a length of 10000 is constructed, and a convolution window sequence GW is calculated. The output voltage sequence a is multiplied with the convolution window sequence GW term by term, and the $k^{th}$ term is added with the $(N_s+k)^{th}$ term sequentially to obtain a sequence $U_{ap}$ after full-phase preprocessing.

Step 4: Fourier analysis is performed on the sequence $U_{ap}$ to obtain a total harmonic characteristic of the output voltage signal, and each even harmonic signal $\dot{U}_{d,i}$ is calculated accordingly. In this embodiment, the eight-order harmonic is considered at the highest.

$$\begin{cases} \dot{U}_{d,2} = 299.81 \text{ mV} \angle 122.4° = 300 \text{ mV} \angle 123° + 3.0 \text{ mV} \angle 29° \\ \dot{U}_{d,4} = 100.96 \text{ mV} \angle 123° = 100 \text{ mV} \angle 123° + 0.97 \text{ mV} \angle 177° \\ \dot{U}_{d,6} = 50.00 \text{ mV} \angle 123.6° = 50 \text{ mV} \angle 123° + 0.52 \text{ mV} \angle 213° \\ \dot{U}_{d,8} = 19.79 \text{ mV} \angle 123° = 20 \text{ mV} \angle 123° + 0.21 \text{ mV} \angle 300° \end{cases}$$

Step 5: It is not difficult to see from the above formula, the zero-offset noises of the magnetic modulator are at the level of 100 µA, which is basically negligible at the DC calibration current $I_{ca}$ of 10 mA, such that the current conversion coefficient $K_i$ of each even harmonic can be calculated in this case:

$$\begin{cases} K_2 = |299.81 \text{ mV} \angle 122.4°| / 10\text{mA} = 29.981 \text{ mV/mA} \\ K_4 = |100.96 \text{ mV} \angle 123°| = 10.096 \text{ mV/mA} \\ K_6 = |50.00 \text{ mV} \angle 123.6°| = 5.000 \text{ mV/mA} \\ K_8 = |19.79 \text{ mV} \angle 123°| = 1.979 \text{ mV/mA} \end{cases}$$

Step 6: After the calibration is completed, a to-be-measured weak DC signal current $I_p$ of 0.1 mA is fed into the magnetic modulator. In this case, each even harmonic detection signal $\dot{U}_{d,i}$ is calculated as follows:

$$\begin{cases} \dot{U}_{d,2} = 4.09 \text{ mV} \angle 76.0° = 3 \text{ mV} \angle 123° + 3.0 \text{ mV} \angle 29° \\ \dot{U}_{d,4} = 1.97 \text{ mV} \angle 120° = 1 \text{ mV} \angle 123° + 0.97 \text{ mV} \angle 117° \\ \dot{U}_{d,6} = 0.72 \text{ mV} \angle 169.1° = 0.5 \text{ mV} \angle 123° + 0.52 \text{ mV} \angle 213° \\ \dot{U}_{d,8} = 0.015 \text{ mV} \angle -105.5° = 0.2 \text{ mV} \angle 123° + 0.21 \text{ mV} \angle 300° \end{cases}$$

In this case, it is not difficult to see from the above formula that the zero-offset noises of the magnetic modulator seriously affect the measurement accuracy of the weak DC signal current of 0.1 mA.

Step 7: Each even harmonic detection signal $\dot{U}'_{d,i}$ is calculated according to the current conversion coefficient $K_i$, and then the full even-order harmonic detection signal $\dot{U}_{even}$ is calculated:

$$\dot{U}_{even} = \frac{K_2}{K_2} * U'_{d,2} + \frac{K_2}{K_4} * U'_{d,4} + \frac{K_2}{K_6} * U'_{d,6} + \frac{K_2}{K_8} * U'_{d,8} =$$

$$4.09 \text{ mV} \angle 76.0° + \frac{29.981}{10.096} * 1.97 \text{ mV} \angle 120.0° + \frac{29.981}{5.000} * 0.72 \text{ mV}$$

$$\angle 169.1° + \frac{29.981}{1.979} * 0.015 \text{ mV} \angle -105.5° = 11.47 \text{ mV} \angle 122.92°.$$

Step 8: The full even harmonic detection signal $\dot{U}_{even}$ is used to calculate the measurement value $I_m$ of the to-be-measured weak DC signal current $$I_m = \frac{2*|\dot{U}_{even}|}{8*K_2} = \frac{2*|11.47 \text{ mV} \angle 122.92°|}{8*29.981 \text{ mV/mV}} = 00.095 \text{ mA}.$$

The full even harmonic digital demodulation method of the present disclosure can greatly reduce the impact of zero-offset noises and further improve the measurement sensitivity and accuracy of the magnetic modulator.

In summary, this application at least has the following beneficial effects:

The full-phase Fourier analysis technology is adopted to perform comprehensive preprocessing and analysis on the output voltage signals of the magnetic modulator. This approach significantly reduces spectrum leakage and phase distortion, ensuring that data sampled at different time points can be fully utilized and enhancing the accuracy of signal processing. Particularly, by applying the Hamming window function and the convolution window sequence for preprocessing, abrupt changes in signal boundaries are effectively smoothed, thereby reducing the edge effects on spectrum analysis, thereby improving the accuracy and reliability of measurement results.

The method mitigates the impact of zero-offset noises by leveraging the phase unity of all the real even harmonics and the phase dispersion of zero-offset noises in all the even harmonics caused by DC calibration current, and by calculating the current conversion coefficients and the even harmonic detection signals. The method significantly improves measurement sensitivity and accuracy, particularly in weak signal detection, for example, measurement of a 10 µA level DC signal, which is crucial for high-precision measurement devices, especially in HVDC transmission systems.

The method excels in extracting useful components from weak signals by comprehensively analyzing the full even harmonic detection signal and accurately calculating with the current conversion coefficients. This helps avoid measurement errors due to insufficient device sensitivity. By analyzing full-phase harmonic characteristics of the to-be-measured weak DC signal current, the method can accurately detect changes in weak signals even in high-noise environments. This high-sensitivity measurement capability is crucial for accurately monitoring and evaluating the operational state of devices in modern power systems, enabling timely detection and warning of potential faults.

Although some preferred examples of the present disclosure have been described, persons skilled in the art can make changes and modifications to these examples once they learn the basic inventive concept. Therefore, the appended claims are intended to be construed to include the preferred examples and all alterations and modifications that fall within the scope of the present disclosure.

Obviously, those skilled in the art can make various changes and modifications to the present disclosure without departing from the spirit and scope of the present disclosure. In this way, if these modifications and variations of the present disclosure fall within the scope of the claims of the present disclosure and equivalent technologies thereof, the present disclosure is further intended to include these modifications and variations.

What is claimed is:

1. A full even harmonic digital demodulation method based on full-phase analysis for a magnetic modulator, comprising:
   obtaining, via a processor, standard voltage timing data output by the magnetic modulator when a direct-current (DC) calibration current with a set amplitude is fed into the magnetic modulator during calibration of the magnetic modulator, wherein the standard voltage timing data comprises standard output voltage signal values at a plurality of time points;
   establishing, via the processor, an output voltage sequence from full-phase Fourier analysis based on the standard voltage timing data, and preprocessing, at the processor, the output voltage sequence;
   performing analysis, via the processor, on the preprocessed output voltage sequence from full-phase Fourier analysis, to obtain all standard even harmonic signals and current conversion coefficients;
   obtaining, via the processor, to-be-measured weak voltage timing data output by the magnetic modulator when a to-be-measured weak DC signal current is fed into the magnetic modulator after the calibration of the magnetic modulator, and performing analysis on the to-be-measured weak voltage timing data at the processor, to obtain all to-be-measured weak even harmonic signals, wherein the to-be-measured weak voltage timing data comprises to-be-measured weak output voltage signal values at a plurality of time points;
   performing, at the processor, analysis on all the to-be-measured weak even harmonic signals and the current conversion coefficients, to obtain a full even harmonic detection signal;
   analyzing, at the processor, a measurement value of the to-be-measured weak DC signal current based on the full even harmonic detection signal; and
   monitoring and evaluating, via the processor, an operational state of devices in modern power systems based on the measurement value;
   said preprocessing the output voltage sequence from full-phase Fourier analysis specifically comprises:
   establishing a Hamming window function sequence, and performing convolution analysis to obtain a convolution window sequence; and
   performing analysis on the output voltage sequence from full-phase Fourier analysis and the convolution window sequence, to obtain a sequence after full-phase preprocessing.

2. The full even harmonic digital demodulation method based on full-phase analysis for a magnetic modulator according to claim 1, wherein said establishing an output voltage sequence from full-phase Fourier analysis specifically comprises:
   selecting standard output voltage signal values at $2N_a-1$ time points from preprocessed standard voltage timing data of the magnetic modulator, to establish the output voltage sequence from full-phase Fourier analysis, wherein
   a specific expression of the output voltage sequence from full-phase Fourier analysis is as follows:

$$U_d = [u_d(0), u_d(1), \ldots, u_d(2N_a - 1)]^T,$$

wherein
$U_d$ is the output voltage sequence from full-phase Fourier analysis, is a $u_d(0)$ is a standard output voltage signal value at a first time point in the output voltage sequence from full-phase Fourier analysis, $u_d(1)$ is a standard output voltage signal value at a second time point in the output voltage sequence from full-phase Fourier analysis, and $u_d(2N_a-1)$ is a standard output voltage signal value at a last time point in the output voltage sequence from full-phase Fourier analysis.

3. The full even harmonic digital demodulation method based on full-phase analysis for a magnetic modulator according to claim 1, wherein said obtaining a convolution window sequence specifically comprises:
   establishing a Hamming window function sequence with a length $N_a$, and performing convolution operation on the Hamming window function sequence with the same sequence, to obtain a $(2N_a-1)$-dimensional convolution window sequence, wherein a specific formula is as follows:

$$\begin{cases} HW(n) = 0.54 - 0.46 * \cos\left(\dfrac{2 * \pi * n}{N_a}\right), \\ GW = HW * HW \end{cases}$$

wherein
HW(n) is a value of a Hamming window function at an index n, π is a natural constant, n is a sample index in a Hamming window, n=0, 1, 2, . . . , $N_a$–1, $N_a$ is, the length of the Hamming window, GW is the convolution window sequence, and HW is the Hamming window function sequence.

4. The full even harmonic digital demodulation method based on full-phase analysis for a magnetic modulator according to claim 3, wherein said obtaining a sequence after full-phase preprocessing specifically comprises:

multiplying the output voltage sequence with the convolution window sequence term-by-term, to obtain a new data sequence, and adding a $k_{th}$ term and a $(N_s+k)^{th}$ term in the new data sequence sequentially, to obtain the sequence after full-phase preprocessing:

$$\begin{cases} y = U_d * GW \\ U_{ap} = \frac{1}{N_a} * [y(N_a), y(1) + y(N_a + 1), \ldots, y(N_a - 1) + y(2N_a - 1)]^T \end{cases},$$

wherein y is the new data sequence, $U_d$ is the output voltage sequence, GW is the convolution window sequence, $U_{ap}$ is the sequence after full-phase preprocessing, $y(N_a)$, $y(1)$, $y(N_a+1)$, $y(N_a-1)$, and $y(2N_a-1)$ are corresponding terms in the new data sequence, and $N_a$ is the length of the Hamming window.

5. The full even harmonic digital demodulation method based on full-phase analysis for a magnetic modulator according to claim 1, wherein said obtaining all standard even harmonic signals specifically comprises:

performing Fourier analysis on the sequence after full-phase preprocessing to obtain a total harmonic characteristic of a standard output voltage signal, and analyzing all the standard even harmonic signals accordingly, wherein the total harmonic characteristic of the standard output voltage signal is as follows:

$$u_d(t) = \sum_{i=1}^{N} [U_{d,i} * \cos(i * \omega_e * t + \varphi_i)],$$

wherein $U_{d,i}$ and $\varphi_i$ are respectively an amplitude and a phase of an i-order harmonic, $\omega_e$ is fundamental angular frequency of a square wave excitation source, i=1, 2, 3, ..., L, and L is a total number of harmonic orders.

6. The full even harmonic digital demodulation method based on full-phase analysis for a magnetic modulator according to claim 5, wherein a specific phasor expression of each even harmonic signal is as follows:
$\dot{U}_{d,i}=U_{d,i}\angle\varphi_i=U_{dr,i}\angle\varphi_{dr,i}+U_{z,i}\angle\varphi_{z,i}$, wherein
$\dot{U}_{d,i}$ is each even harmonic signal, $U_{d,i}$ and $\varphi_i$ are respectively the amplitude and phase of the i-order harmonic, $U_{dr,i}$ and $\varphi_{dr,i}$ are an amplitude and a phase of a real even harmonic caused by a DC current, $U_{z,i}$ and $\varphi_{z,i}$ are zero-offset noises of each even harmonic, i=1, 2, 3, ..., L, and L is the total number of harmonic orders.

7. The full even harmonic digital demodulation method based on full-phase analysis for a magnetic modulator according to claim 6, wherein the current conversion coefficient is obtained by analyzing each standard even harmonic signal and the DC calibration current, and a specific formula is as follows:

$$K_i = \frac{|\dot{U}_{d,i}|}{I_{ca}}.$$

wherein $K_i$ is a current conversion coefficient of the i-order harmonic, $\dot{U}_{d,i}$ is an even harmonic signal of the i-order harmonic, $I_{ca}$ is the DC calibration current, i=1, 2, 3, ..., L, and L is the total number of harmonic orders.

8. The full even harmonic digital demodulation method based on full-phase analysis for a magnetic modulator according to claim 7, wherein a specific expression of the full even harmonic detection signal is as follows:

$$\dot{U}_{even} = \frac{K_2}{K_2} * U'_{d,2} + \frac{K_2}{K_4} * U'_{d,4} + \ldots + \frac{K_2}{K_{N_2}} * U'_{d,N_2},$$

wherein $\dot{U}_{even}$ is the full even harmonic detection signal, $N_2$ is a highest-order even harmonic set during full even harmonic demodulation, $K_{N_2}$ is a current conversion coefficient for the highest-order even harmonic set in full even harmonic demodulation, and $\dot{U}'_{d,N_2}$ is a to-be-measured weak even harmonic signal for the highest-order even harmonic set in full even harmonic demodulation.

9. The full even harmonic digital demodulation method based on full-phase analysis for a magnetic modulator according to claim 8, wherein a specific formula for analyzing the measurement value of the to-be-measured weak DC signal current is as follows:

$$I_m = \frac{2 * |\dot{U}_{even}|}{N_2 * K_2},$$

wherein $I_m$ is the measurement value of the to-be-measured weak DC signal current, $\dot{U}_{even}$ is the full even harmonic detection signal, and $N_2$ is the highest-order even harmonic set in full even harmonic demodulation.

* * * * *